United States Patent Office 2,796,196
Patented June 18, 1957

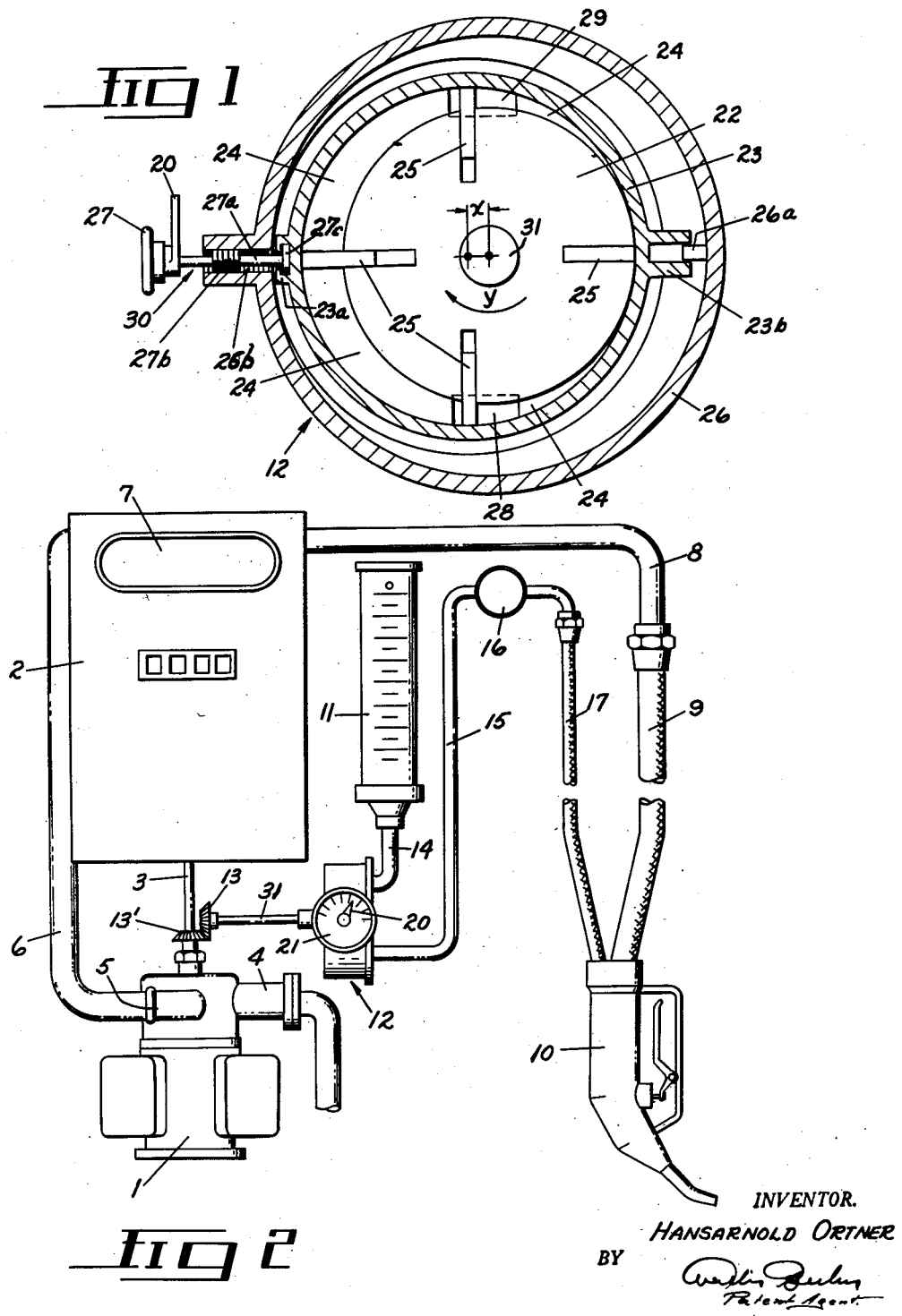

2,796,196

MEASURING AND METERING DEVICE FOR MEASURING FUEL WITH AN ADMIXTURE OF OIL

Hansarnold Ortner, Paderborn, Germany, assignor to Deutsche Gerätebau Gesellschaft mit beschrankter Haftung, Salzkotten, Germany, a limited liability company Application June 22, 1953, Serial No. 363,147

Claims priority, application Germany June 23, 1952

3 Claims. (Cl. 222—48)

The present invention relates to a measuring and metering device for measuring fuel with an admixture of oil.

It is a well-known fact that the filling of motor vehicles with gasoline with an admixture of oil has heretofore consumed considerable time inasmuch as it was necessary to use a mixing can in which the filling station operator had to admix the oil to the gas at the desired ratio. Whether the proper ratio was obtained depended solely on the judgment of the operator. Furthermore, it was practically impossible in this way to obtain a homogeneous gasoline and oil mixture.

It is, therefore, an object of this invention to provide a measuring and metering device for dispensing fuel with an admixture of oil, which will overcome the above mentioned drawbacks.

It is also an object of this invention to provide a device of the type set forth above, in which the desired ratio of gasoline and oil admixture can quickly and easily be adjusted whereupon the dispensing device will automatically be able to dispense gasoline and oil simultaneously at the desired ratio.

These and other objects and advantages of the invention will appear more clearly from the following specification in connection with the accompanying drawings in which:

Figure 1 illustrates a positive displacement pump-motor device with variable eccentricity for use in connection with an arrangement according to the present invention.

Figure 2 is a diagrammatic illustration of a measuring and metering device for the measuring and dispensing of fuel with an admixture of oil according to the present invention.

General arrangement

The fuel measuring device according to the present invention is designed in a manner known per se as piston equipped measuring device, e. g. provided with a calculating mechanism, while the oil metering device is drivingly connected to said fuel measuring device and is designed as a positive displacement pump-motor device, preferably as rotary driving slide piston or as rotary displacement piston pump, the eccentricity of said positive displacement pump-motor device being changeable by adjustment of the non-rotating casing in which the pistons rotate. The operating means for effecting said change in the eccentricity is preferably combined with a pointer which indicates on a dial visible on the dispensing pump column the set oil delivery as a fraction of the fuel delivery.

By "positive displacement pump-motor device" is meant a device which may be used as pump as well as motor and which comprises two members arranged eccentrically with regard to each other. The said two members form cells or chambers with each other, while one of said members is arranged rotatably, and the size of the cells or chambers between said members changes with each revolution from a maximum to a minimum value. While said cells or chambers are increasing in size, they are connected with a liquid supply conduit, whereas during the decrease of their size, said cells or chambers communicate with a liquid discharge conduit.

Structural arrangement

Various embodiments of positive displacement pump-motor devices are known. One embodiment of a positive displacement pump-motor device with variable eccentricity, frequently called "rotary driving slide piston," is shown in section in Figure 1.

Mounted on a shaft 31 for rotation therewith is a disc 22 which is arranged within a non-rotatable ring 23. Disc 22 and ring 23 form with each other cells or chambers 24 which are sealed with regard to each other by partitions 25 slidably arranged in the disc 22. The lateral confinement of said cells or chambers is effected by the sidewalls of the casing 26, in which the parts 22, 23 and 25 are laterally sealing. The ring 23 is arranged in the casing 26 so that by means of an adjusting device generally designated 30 and operated by a knob 27, ring 23 can be displaced by a distance $x$, Fig. 1 diagrammatically illustrates how ring 23 may be displaced. As will be evident from Fig. 1, one side of ring 23 is supported by a spindle 27a of the adjusting device, said spindle being journalled in a bearing 23a which extends around and below the head 27c of spindle 27a. The other end of ring 23 is supported by a stud 26a connected to the casing 26 and slidably supporting the bearing 23b. The spindle 27a has a portion 27b thereof provided with a thread threadedly engaging a threaded portion 26b of the casing 26 in such a manner that said spindle will be moved in axial direction by the distance $x$, thereby displacing ring 23 accordingly, when the spindle 27a is rotated, the angle of rotation thereof is indicated by the position of a pointer 20, which is fixedly connected to the knob 27, relative to the stationary dial 21 (shown in Fig. 2 only). When the center of ring 23 is located eccentrically with regard to the center of the disc 22, the volume of each cell or chamber 24 varies with each revolution of the disc 22 between a minimum and a maximum value while the disc 22 rotates in the direction of the arrow $y$. While each cell or chamber is increasing in volume, it is connected with the liquid inlet port 28, whereas each cell or chamber communicates with the liquid discharge port 29 while its volume is decreasing. When the disc 22 is driven, the positive displacement pump-motor device acts as a pump. If fluid under pressure is supplied to said device, it will act as a motor.

By adjusting the ring 23 by means of the adjusting knob 27, the quantity of fluid passing through may be varied from zero to a maximum value. The quantity of fluid passing through is zero, when the eccentricity of the members 22 and 23, i. e., the distance $x$, is reduced to zero. Correspondingly, the quantity of liquid passing through reaches its maximum value when the eccentricity reaches its maximum value. Positive displacement pump-motor devices with variable eccentricity are thus particularly adapted for measuring and metering devices, especially such with which an adjustment is to be effected during the operation, because with these displacement pump-motor devices, the adjustment device is stationary also during operation of the positive displacement pump-motor device and thus can be actuated.

Positive displacement pump-motor devices are not quite as accurate as piston equipped measuring devices which, as is known, are used in connection with gasoline pumps and with which a piston moves up and down in a measuring cylinder. The reason why positive displacement pump-motor devices are not quite as accurate as piston equipped measuring devices consists in that with the low viscosity of the fuel, the slippage of the positive displacement pump-motor device is too great. However, surprisingly, it has been found that with lubricating oils which are used as admixture to fuel such as gasoline, the volumetric efficiency of positive displacement pump-motor devices is during a change in the viscosity influenced in a manner opposite to the influence exerted upon the slippage and practically compensates the latter especially when, for measuring the oil, positive displacement pump-motor devices of that type are employed which are known in the literature as rotary driving slide pistons, or of that type which are usually designated as rotary displacement pistons. To the extent to which with positive displacement pump-motor devices the slippage increases with decreasing viscosity, the charge of the cells or chambers is increased so that with these devices an adjustment of the set delivery in conformity with the temperature of the oil is unnecessary.

Accordingly, in conformity with the present invention a measuring and metering device for measuring fuel with an admixture of oil is provided according to which a piston equipped measuring device known per se serving as fuel measuring device and provided with a calculating mechanism is mechanically coupled to a positive displacement pump-motor device acting as an oil metering device. The change in the eccentricity of said oil metering device is effected by adjusting the non-rotatable member thereof. This combination represents an ideal solution for a measuring device for fuel with variable admixture of oil. Such a measuring device is characterized by extremely simple structure, great reliability, and precision in operation and makes it possible in any setting to adjust from the outside the ratio between oil and fuel. To this end, it is merely necessary to actuate the adjusting device for the adjustment of the non-rotating member of the positive displacement pump-motor device, said adjusting device being accessible from the outside. This structure also makes it possible in a very simple manner to give the indicating device a very appealing appearance inasmuch as it can be designed as a dial with adjustable pointer similar to the indicating devices for indicating the wave length or stations of wireless sets, since it is possible without difficulty to arrange the adjusting mechanism of the positive displacement pump-motor device and the indicating device in one and the same plane and to connect said adjusting mechanism and said indicating device with each other in a simple manner by a cable or rope drive. The set oil delivery is preferably indicated as fraction of the fuel delivery so that the buyer can immediately read off the mixing ratio of the fuel oil mixture being sold to him. The delivery of the oil to the metering device is preferably effected from a glass container with a graduation visible from the outside so that the buyer also by watching said graduation can check the quantity of oil which is being sold to him and metering by the dispensing pump column.

Figure 2 of the drawing diagrammatically illustrates a measuring and metering device for the measuring of fuel with an admixture of oil according to the present invention. By means of an electrically or manually operated pump, not shown in the drawing, the fuel is supplied through the connection 4 to the piston equipped measuring device 1 and from there is conveyed through the connection 5, conduit 6, sightglass 7 and pipe 8 to the hose 9. The shaft 3 of the piston equipped measuring device 1 is adapted to drive the calculating mechanism 2. Through the intervention of a bevelled gear transmission 13, a rotary driving slide piston system 12 of the type illustrated in Fig. 1 is driven whose set and variable eccentricity is indicated on the dial 21 by means of the pointer 20 which is the same as the above mentioned pointer 20 of the adjusting device 27 of Fig. 1. The dial 21 is not shown in Fig. 1.

The arrangement shown in Figure 2 furthermore comprises an oil gauge glass 11 which is provided with a graduation and which prior to each pumping or delivery operation is filled with oil up to the zero mark. This oil gauge glass 11 supplies oil through conduit 14 to the rotary driving slide piston system 12, which latter conveys the respective pumped quantity of oil through conduit 15 and a sightglass 16 to the hose 17. The fuel hose 9 and the oil hose 17 are connected to a fuel dispenser nozzle 10 within which the mixture of the fuel with the oil takes place during the pumping or filling operation.

It is, of course, understood that the present invention is, by no means, limited to the particular arrangement shown in the drawings but also comprises any modifications within the scope of the appended claims.

What I claim is:

1. A fuel dispensing apparatus for dispensing gasoline with an admixture of oil, which comprises in combination: a reciprocable piston equipped measuring device for measuring and delivering gasoline, a positive displacement pump-motor device for measuring and delivering oil, said pump-motor device including a rotatable element and a non-rotatable reciprocable element movable selectively into and out of concentric position with said rotatable element for varying the amount of oil delivery of said pump-motor device, adjusting means operatively connected to said reciprocable non-rotatable element for varying the position thereof, coupling means drivingly connecting said rotatable element of said pump-motor device to said reciprocable piston equipped measuring device, and indicating means operatively connected to said non-rotatable element of said pump-motor device for indicating the ratio of oil being delivered by said pump-motor device to the gasoline simultaneously being delivered by said reciprocable piston equipped measuring device.

2. A fuel dispensing apparatus according to claim 1, in which said positive displacement pump-motor device is designed as rotary slide piston pump-motor device.

3. A fuel dispensing apparatus for dispensing gasoline with an admixture of oil, which comprises in combination: a reciprocable piston equipped measuring device for measuring and delivering gasoline, a positive displacement pump-motor device for measuring and delivering oil, said positive displacement pump-motor device including a rotatable member and a non-rotatable reciprocable member selectively movable into a plurality of eccentric positions relative to said rotatable member, to thereby vary the delivery of said pump-motor device, driving means drivingly interconnecting said reciprocable piston equipped measuring device and said rotatable element of said pump-motor device, indicating means operatively connected to said non-rotatable reciprocable element of said pump-motor device for indicating the ratio of oil being delivered by said pump-motor device to the gasoline simultaneously being delivered by said reciprocable piston equipped measuring device, gauge means mounted on and visible from the outside of said apparatus and communicating with said pump-motor device for indicating the quantity of oil being delivered, and dispensing means common to both said oil and said gasoline delivering device for simultaneously dispensing oil and gasoline at a desired mixing ratio.

References Cited in the file of this patent

UNITED STATES PATENTS

| Number | Name | Date |
| --- | --- | --- |
| 976,148 | Caps | Nov. 22, 1910 |
| 1,964,028 | Boynton et al. | June 26, 1934 |
| 1,985,918 | De Lancey | Jan. 1, 1935 |
| 2,600,477 | Burt | June 17, 1952 |